(12) United States Patent
Giannini

(10) Patent No.: US 8,516,015 B2
(45) Date of Patent: Aug. 20, 2013

(54) MECHANISM FOR MAKING CHANGES TO SERVER FILE SYSTEM

(75) Inventor: Robert Giannini, Markham, CA (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 12/832,761

(22) Filed: Jul. 8, 2010

(65) Prior Publication Data

US 2011/0055288 A1 Mar. 3, 2011

(30) Foreign Application Priority Data

Sep. 3, 2009 (CA) ..................................... 2676735

(51) Int. Cl.
*G06F 7/00* (2006.01)
*G06F 17/30* (2006.01)

(52) U.S. Cl.
USPC ........... 707/805; 715/748; 717/109; 707/822; 707/828

(58) Field of Classification Search
USPC .......... 707/805, 822, 828; 715/748; 717/109
See application file for complete search history.

(56) References Cited

U.S. PATENT DOCUMENTS

| 6,901,403 | B1 | 5/2005 | Bata et al. |
| 7,322,010 | B1* | 1/2008 | Mikula ......................... 715/734 |
| 8,032,634 | B1* | 10/2011 | Eppstein et al. ............... 709/226 |
| 2004/0085581 | A1 | 5/2004 | Tonkin |
| 2005/0091254 | A1 | 4/2005 | Stabb et al. |
| 2005/0273486 | A1 | 12/2005 | Keith, Jr. |
| 2007/0064603 | A1* | 3/2007 | Chen et al. .................... 370/230 |
| 2007/0297029 | A1 | 12/2007 | Low et al. |
| 2008/0178117 | A1 | 7/2008 | Gelman et al. |
| 2008/0222547 | A1 | 9/2008 | Wong et al. |
| 2010/0223610 | A1* | 9/2010 | Dehaan et al. ................ 717/178 |

FOREIGN PATENT DOCUMENTS

WO WO2005119494 A2 12/2005

OTHER PUBLICATIONS

Pam Derringer, "Linux Summit will preview new advanced file system", Oct. 13, 2008, SearchEnterpriseLinux.com (http://searchenterpriselinux.techtarget.com/news/article/0,289142,sid39_gci1334319,00.html).

* cited by examiner

*Primary Examiner* — Jeffrey A Burke
(74) *Attorney, Agent, or Firm* — Law Offices of Ira D. Blecker, P.C.

(57) ABSTRACT

A method, apparatus, and computer product are provided for implementing changes to a file system of computing device. A virtual file system is created as a copy of a hierarchical structure of a file system of a computing device. The virtual file system appears as the actual file system when displayed and is a graphical representation of the file system. Changes can be made to the virtual file system without affecting the file system. Responsive to the changes, an appearance of the virtual file system is correspondingly modified to reflect the changes. Responsive to the changes, commands are generated corresponding to the changes. The commands reflect changes to the virtual file system, and the commands are stored. The commands are provided for execution on the computing device, and the commands cause the file system of the computing device to reflect changes made to the virtual file system.

18 Claims, 16 Drawing Sheets

Deployment Report for C:\Sample.dbs Generated on: 7/13/2009 7:41:05 AM

| Step | Command | Comment |
|---|---|---|
| 1 | Create Directory: c:\Sample\Folder | |
| 2 | Copy File: c:\temp\install\SampleFile.txt to c:\Sample\Folder\SampleFile.txt | |
| 3 | Copy File: c:\temp\install\SampleFile2.dll to c:\Sample\SampleFile2.dll | |
| 4 | Copy File: c:\temp\install\Installer\setup.msi to c:\Sample\setup.msi | |
| 6 | Execute the following command: db2cmd /c db2 -tvf c:\sql\db2_script.ddl and fail on a non zero return code | |

End of Deployment Report

MECHANISM FOR MAKING CHANGES TO SERVER FILE SYSTEM

BACKGROUND

Exemplary embodiments relate to making changes to a file system of a computer, and more specifically, to mechanisms for planning, previewing, and reviewing the changes.

In a computer, a file system (often also written as filesystem) is a method for storing and organizing computer files and the data they contain to make it easy to find and access them. File systems may use a data storage device such as a hard disk or CD-ROM and involve maintaining the physical location of the files. Also, file systems might provide access to data on a file server by acting as clients for a network protocol. More formally, a file system is a special-purpose database for the storage, organization, manipulation, and retrieval of data.

In today's age, large file systems may be on servers. For varied reasons, changes periodically need to be made to various files in the file system. Although changes may be planned for a file system, when the actual changes are put into effect on the file system, some of the changes may be incorrect, or the results may be different from what was initially expected.

BRIEF SUMMARY

According to one exemplary embodiment, a method for implementing changes to a file system of a computing device is provided. A virtual file system is created as a copy of a hierarchical structure of a file system of a computing device. The virtual file system appears as the actual file system of the computing device when displayed and is a graphical representation of the file system of the computing device. A user is allowed to make changes to the virtual file system without affecting the file system of the computing device. In response to the user making changes to the virtual file system, an appearance of the virtual file system is correspondingly modified to reflect the changes made by the user, and the changes to the virtual file system are stored. In response to the user making changes to the virtual file system, commands are generated corresponding to the changes made by the user. The commands reflect changes to the virtual file system, and the commands are stored. The commands are provided for execution on the computing device, and the commands cause the file system of the computing device to reflect the changes made to the virtual file system.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features of the present disclosure are apparent from the following detailed description taken in conjunction with the accompanying drawings in which:

FIGS. 5-14 illustrate examples of utilizing a deployment planner in accordance with exemplary embodiments.

DETAILED DESCRIPTION

Exemplary embodiments provide a mechanism for planning, previewing, and reviewing changes to a file system of a computer system, such as a server. Exemplary embodiments may provide a familiar interface which may be similar to Windows® Explorer. Exemplary embodiments, e.g., via a deployment planner application, allow users to make file system changes and preview the results without anything actually changing on the physical server. Utilizing the deployment planner, changes can be reviewed by other system administrators to ensure that nothing has been missed and no errors have been made. Changes can be made ahead of time using the deployment planner, which allows the operator to see the final results of the change before implementation. Once this has been completed, the changes can be scheduled to run automatically on the server at a specified time. The deployment planner can generate a list of changes and provide the list to the client so that all parties know exactly what will be changing on the server.

Operators can interact with the deployment planner by right clicking file system objects and selecting the appropriate action and/or by using drag and drop actions to move files. After each change step is completed by the user, the action is recorded in a list at the bottom of a screen and the changes are applied to a preview directory and file system view. This allows operators to know exactly what has changed and enable them to remove unnecessary or incorrect steps.

Figure 1:
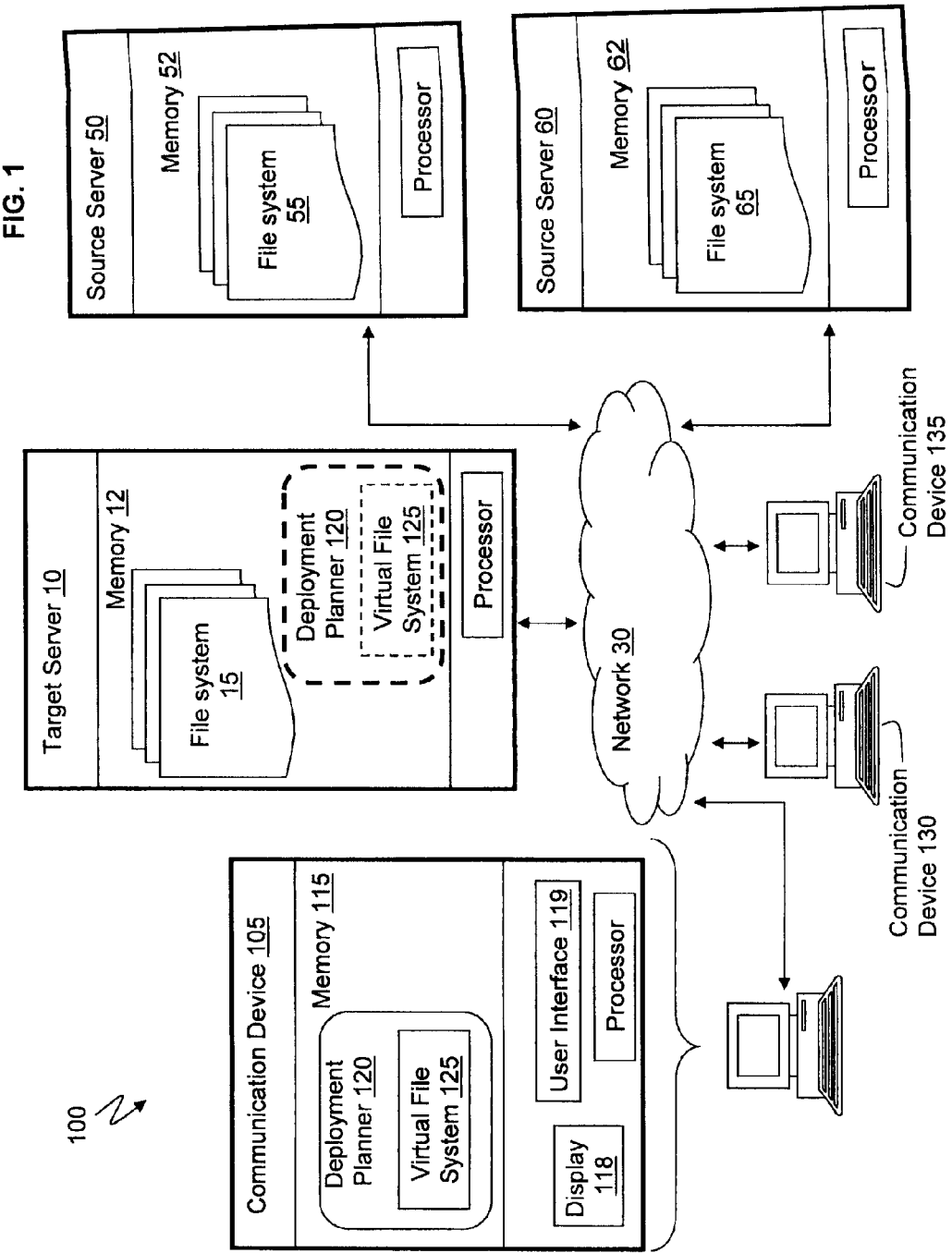
FIG. 1 illustrates a block diagram in accordance with exemplary embodiments.

Now turning to FIG. 1, FIG. 1 illustrates a block diagram 100 in accordance with exemplary embodiments. The block diagram 100 may include a communication device 105, a communication device 130, and a communication device 135. Although not shown in FIG. 1 for the sake of conciseness, it is understood that the communication devices 130 and 135 may include all the features of communication device 105 illustrated in FIG. 1 and discussed herein. Any discussion for the communication device 105 may also apply for the communication devices 130 and 135. The communication device 105 may include, for example and without limitation, mobile telephones, landline telephones, smart telephones, soft telephones, personal digital assistants, set top boxes (STB), televisions (TV), game consoles, MP3 players, computers, and servers which are capable of communicating over a network 30.

Further regarding the network 30, the network 30 may include circuit-switched and/or packet-switched technologies and devices, such as routers, switches, hubs, gateways, etc., for facilitating communications. The network 30 may include wireline and/or wireless components utilizing, e.g., IEEE 802.11 standards for providing over-the-air transmissions of communications. The network 30 can include IP-based networks for communication between a customer service center and clients/users. The network 30 can manage multiple accounts as established by particular users. These accounts may then be used to provide access to services as described herein. Also, the network 30 may include wireline and/or wireless components utilizing standards, e.g., multimedia messaging services (MMS). The network 30 may include a multimedia messaging center (MMC), which implements the network side of multimedia messaging service (MMS) and makes it possible for an operator to offer multimedia messaging to mobile communication device users. The network 30 can include a managed IP and/or wireless network administered by a service provider, which can control bandwidth and quality of service for the communications discussed herein. The network 30 may be implemented in a wireless fashion, e.g., using wireless protocols and technologies, such as WiFi, WiMax, BLUETOOTH, etc. The network 30 can also be a packet-switched network, such as a local area network, a wide area network, a metropolitan area network, an Internet network, or other similar types of networks. The network 30 may be a cellular communications network, a fixed wireless network, a wireless local area network (LAN), a wireless wide area network (WAN), a personal area network (PAN), a virtual private network (VPN), an intranet or any other suitable network, and the network 30 may include equipment for receiving and transmitting signals, such as a cell tower, a mobile switching center, a base station, and a wireless access point.

In FIG. 1, the communication device 105 includes memory 115. The memory 115 is a tangible computer readable memory having computer executable instructions for execution on one or more processors, as understood by one skilled in the art. The memory 115 may comprise a deployment planner 120 configured to allow system administrators to make multiple changes to a file system of a server, mobile phone, set top box, media hub, and/or any computer system; the deployment planner 120 allows the system administrators to preview the results of their changes without actually implementing the change to the physical file system on the server until ready. The deployment planner 120 may be implemented as software, applications, one or more modules, etc.

For example, an administrator may desire to make changes to a target server 10. The target server 10 may include a memory 12, and the memory 12 may comprise a file system 15 as shown in FIG. 1. The file system 15 is the target for changes that are planned for the target server 10 via the deployment planner 120. The user of the communication device 105 utilizes user interfaces 119, such as a keyboard, touch screen, and/or mouse, to operatively connect to the target server 10. Once connected, the user of communication device 105 can utilize the deployment planner 120 to view the file system 15 of the target server 10 on a display 118 of the communication device 105. The deployment planner 120 is configured to create a virtual file system 125 on the communication device 105 identical (e.g., visually, graphically, and representatively) to the actual file system 15 of the target server 10, and the virtual file system 125 is accessible for manipulation on the communication device 105. Additionally and/or alternatively, the deployment planner 120 may partially or entirely reside on the target server 10, and the virtual file system 125 may be created on the target server 10 and accessible for manipulation. For explanatory purposes, the deployment planner 120 and virtual file system 125 may be discussed with reference to the communication devices 105, 130, and 135 but it is understood by one skilled in the art that the deployment planner 120 and virtual file system 125 may be on the memory 12 of the target server 10 as well. Also, a keyboard, display screen, mouse, etc., may be operatively connected to the target server 10, so that the deployment planner 120 may be run on the target server 10 as a single stand-alone computer not requiring network connections. As such, a user may operate the deployment planner 120 on the target server 10 without requiring the communication devices 105, 130, and 135 in accordance with exemplary embodiments.

The virtual file system 125 is an interactive copy of the file system 15 of the target server 10. The virtual file system 125 looks identical to the file system 15, and the virtual file system 125 may also be referred to as a preview directory and file system view. For instance, utilizing the deployment planner 120, a user may view the virtual file system 125 on the display 118 to see the various directories copied from the target file system 15. The virtual file system 125 may be a snapshot of the directories, folders, and/or files in file system 15, and the virtual file system 125 can have its files changed in the deployment planner 120 without actually changing anything in the file system 15 of the target server 10. The virtual file system 125 is a visual representation of the entire file system 15 and/or a portion of the file system 15. The deployment planner 120 may show various information of the files of the virtual file system 125. For example, for the files of the virtual file system 125 representing the file system 15, the deployment planner 120 may display the path which shows the source/destination location of the directory in use; display information about directory size, disk usage, and disk name; display information about the file name, extension, date and time of creation, last modification, and permissions (attributes); and display information about the number of files in the directory and sum of size of selected files.

Figure 7:
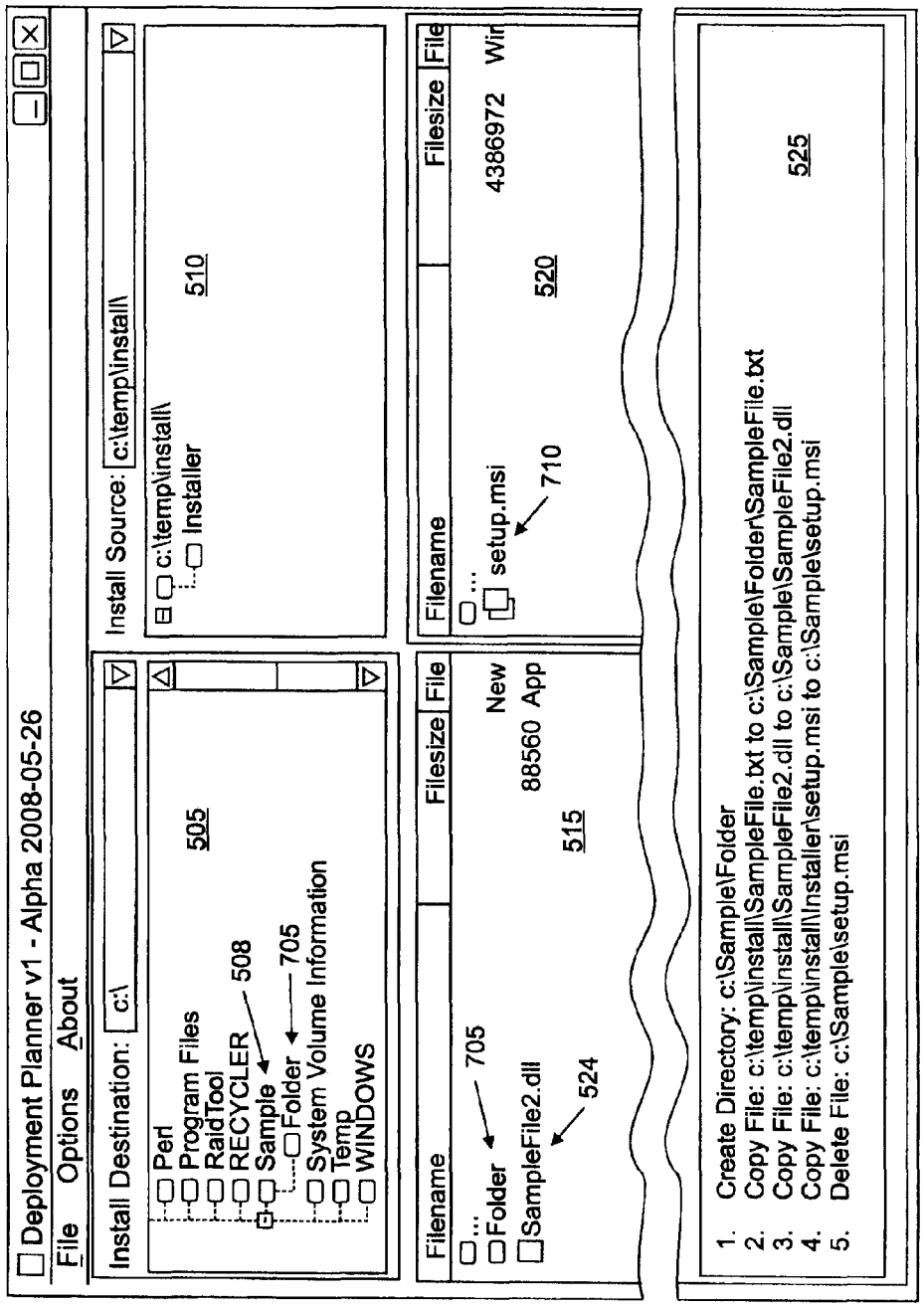

The deployment planner 120 presents the virtual file system 125 as a graphical user interface displayed on the display 118, and the deployment planner 120 allows the user to interact with the virtual file system 125 to make various changes (via the user interface 119) to files by utilizing operations such as create, open, edit, view, print, execute, play, rename, move, copy, delete, attributes, properties, search/find, add, and permissions. That is, the user can interact with and make changes to the files of the virtual file system 125 as though he were interacting with and making changes to the actual file system 15, and the user can view the results of each change to the virtual file system 125 on the display 118 in real time. For each change interactively made by the user to the virtual file system 125, the deployment planner 120 generates the corresponding command instructions, saves the commands in a (XML) file, and displays the commands in a command panel 525 as shown in FIG. 7. All of these commands corresponding to user changes will later be used to implement the planned changes on the actual file system 15 of the target server 10.

When the hierarchical structure of the directories of the actual file system 15 have been copied and represented as the virtual file system 125, the deployment planner 120 may display the hierarchy of files in the virtual file system 125 in many different interactive pictorial representations, which may be, e.g., a navigational file manager representation and/or a spatial file manger representation. A navigational file manager, also called an explorer type manager, uses a "navigational" metaphor to represent the file system locations and a classic representative is Windows® Explorer. Spatial file managers use a spatial metaphor to represent files and folders as if they were real physical objects. A spatial file manager imitates the way people interact with physical objects.

While utilizing the deployment planner 120, the user of the communication device 105 may operatively connect to a source server 50 and/or a source server 60 via the network 30. The servers 50 and 60 may be considered sources because files (or any type of media) on the servers 50 and 60 are available to be copied to the target server 10 by utilizing the deployment planner 120. Before the changes are made to the target server 10, the deployment planner 120 allows the files to be copied and installed in the virtual file system 125 representing the file system 15 of the target server 10. For example, the source server 50 may include memory 52 comprising a file system 55 and the source server 60 may include memory 62 comprising a file system 65. The deployment planner 120 is configured to allow the user to view the various files in the file system 55 of the source server 50 on the display 118. Utilizing the deployment planner 120, the user can copy files including individual applications from the file system 55 to the virtual file system 125 to see and determine how the changes would appear on the actual target file system 15. In accordance with exemplary embodiments, when the user goes through the steps to copy files to the virtual file system 125 from the file system 55 of the source server 50, files of the file system 55 are not actually copied into the virtual file system 125 although the files appear copied to the user on the display 118. Rather, the deployment planner 120 allows the user to execute the changes on the virtual file system 125 and shows the actual appearance of each change in the virtual file system 125 without having to, e.g., transfer the contents of each file copied from the file system 55. For example, the deployment planner 120 copies the pictorial representation of the files to the virtual file system 125 in the desired location.

In FIG. 1, exemplary embodiments are not limited to but are capable of being implemented in the block diagram 100 illustrated in FIG. 1. Additionally, the servers 10, 50, and 60 may be representative of numerous servers. The communication devices 105, 130, and 135 and network 30 may be representative of numerous types of communication devices and networks. Therefore, the block diagram 100 illustrated in FIG. 1 is neither limited numerically to the elements depicted therein nor limited to the exact configuration and operative connections of elements. Further, it is understood by those skilled in the art that elements may be added to, subtracted from, or substituted for the elements described in the system 100 of FIG. 1. Also, the target server 10 may include the elements of the communication device 105, such as the deployment planner 120 and the virtual file system 125 in the memory 12. Also, the servers 10, 50, 60 and the communication devices 105, 130, and 135 may include elements of and/or be implemented in a processor based computer system as discussed in FIG. 15.

Figure 3:
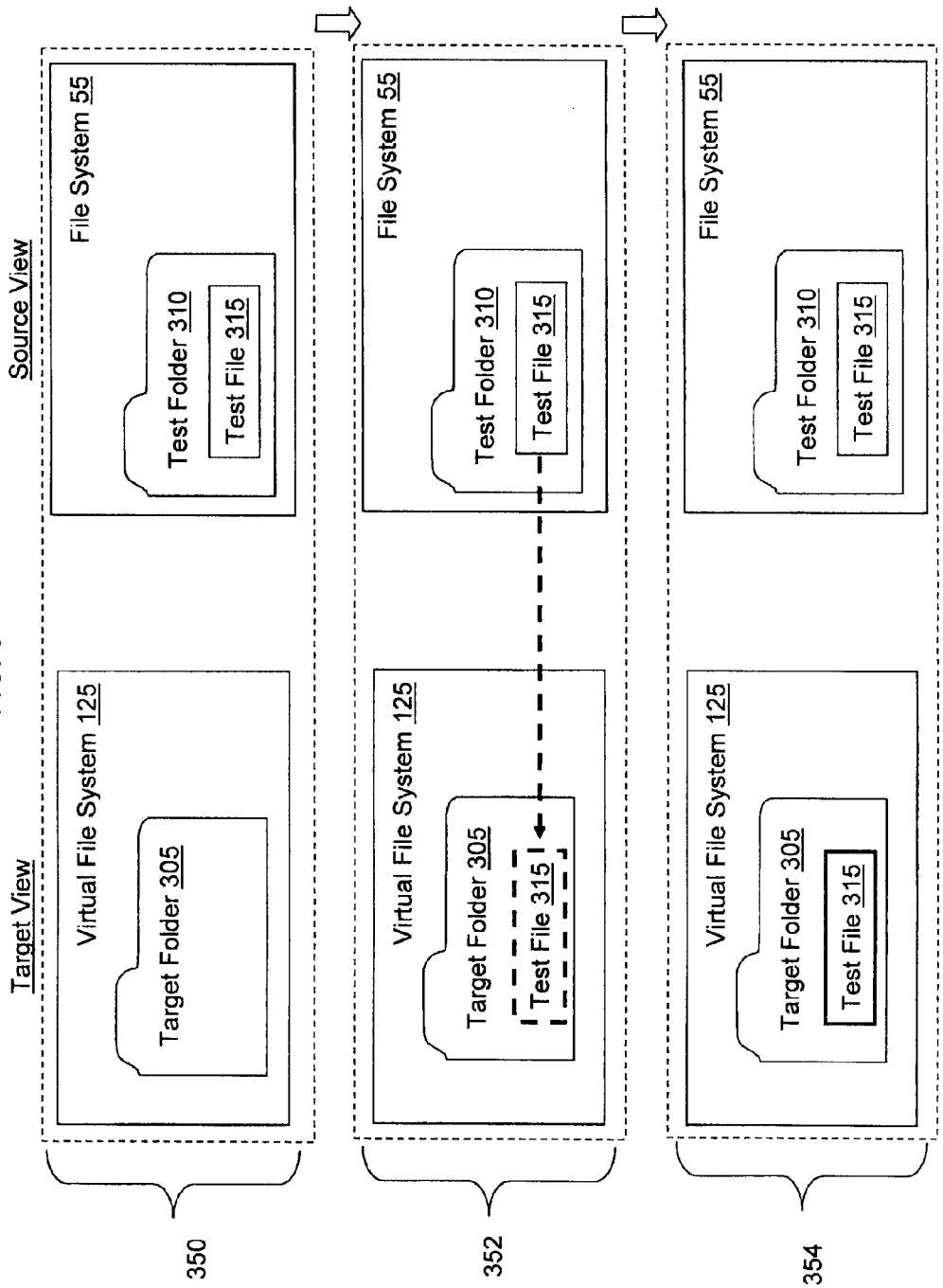
FIG. 3 illustrates a series of screens for a deployment planner depicting a user making changes in accordance with exemplary embodiments.

Now turning to FIG. 3, FIG. 3 illustrates an example of utilizing the deployment planner 120 to make planned changes to the target server 10 in accordance with exemplary embodiments. The deployment planner 120 may create the virtual file system 125 by taking a snapshot of the folders in the target file system 15 of the target server 10. When created from the target file system 15, the virtual file system 125 looks identical to the target file system 15. For example, the virtual file system 125 may be a visual copy of the C directory of the target file system 15, and the deployment planner 120 pictorially illustrates the various folders in the C directory of the target file system 15 as being in the virtual file system 125. To the user, it appears that the user is working with the file system 15 in the target server 10 while the user is actually making the planned changes to folders in the virtual file system 125 via the deployment planner 120.

FIG. 3 represents a series of screens for the deployment planner 120 that can be viewed by the user on the display 118. The left side shows panels illustrating the virtual file system 125 as the target view, and the right side shows panels illustrating the source file system 55 as the source view. Among the numerous folders now in the virtual file system 125 copied from the file system 15, the user may utilize the deployment planner 120 to select a fictions folder named target folder 305 in the virtual file system 125 by clicking a mouse user interface 119, and the target folder 305 may be empty as shown in screen 350. Also, in screen 350 the deployment planner 120 shows the source file system 55 with a test folder 310, and the user may open up (e.g., by clicking the mouse user interface 119) the test folder 310 to view a test file 315 via the deployment planner 120.

In screen 352, the user may elect to copy the test file 315 from the test folder 310 of the file system 55 to the target folder 305 of the virtual file system 125, e.g., by clicking on and dragging the test file 315. The deployment planner 120 may create an icon for the test file 315 in the target folder of the virtual file system 125, which illustrates to the user that the test file 315 has been copied from the source server 50 to the virtual file system 125. The visual representation of the test file 315 copied to the target folder 305 of the virtual file system 125 would appear identical to the visual representation of the test file 315 in the file system 55 as shown in screen 354. The deployment planner 120 generates and saves commands to reflect the changes that were just made to the target folder 305 of the virtual file system 125.

For explanatory purposes, FIG. 3 illustrates the test file 315. In accordance with exemplary embodiments, the user may copy multiple files from different folders in the file system 55 to different folders in the virtual file system 125 as discussed herein, and the virtual file system 125 will display for the user on the display 118 a visual representation of each file copied from the file system 55, along with the corresponding generated commands. The visual representation of the virtual file system 125 will change with each file copied from the source server 50 to show the user each and every change that has occurred. The visual representation of the changes can take place in the virtual file system 125 for the user to view on the display 118 without affecting the target file system 15.

Figure 4:
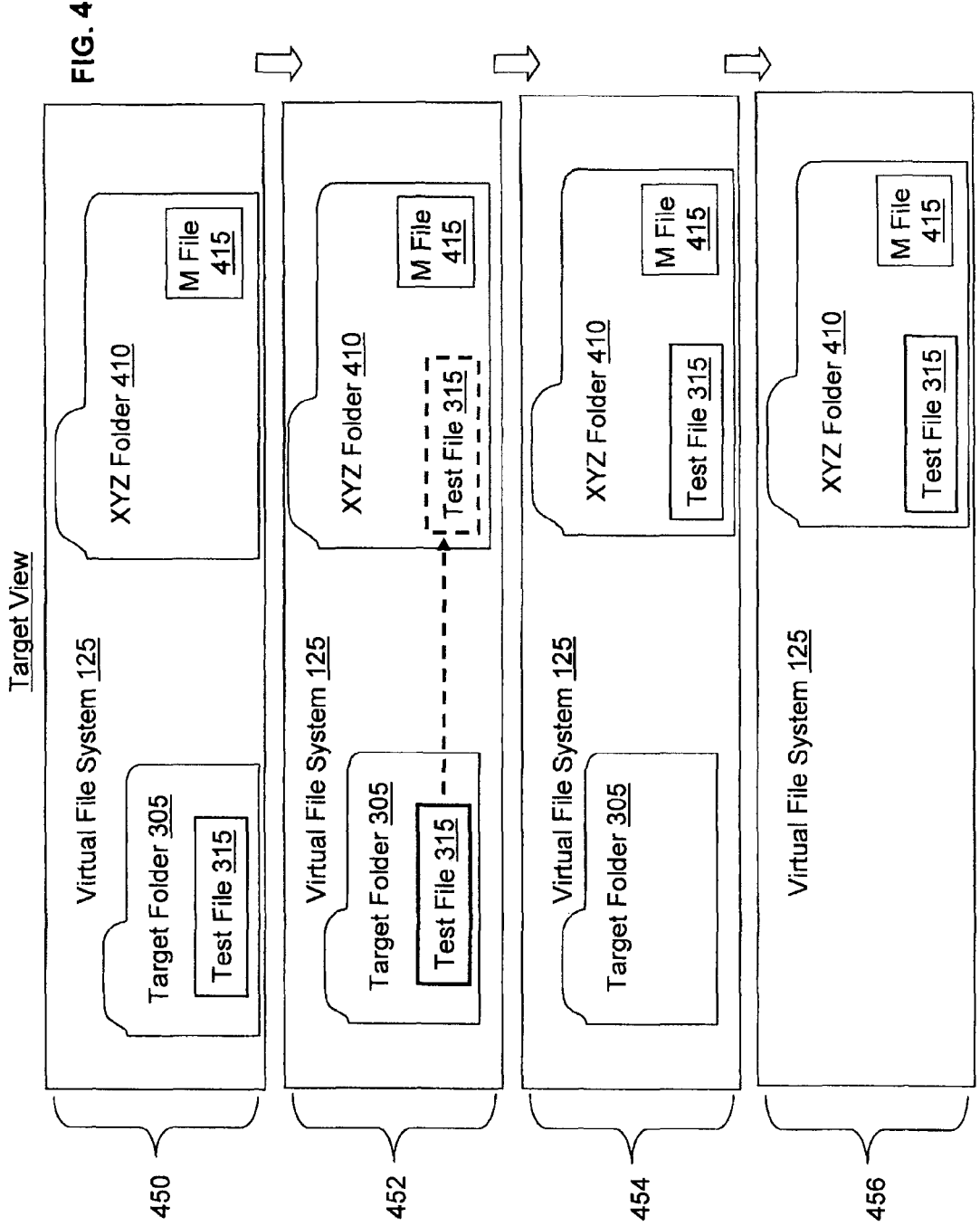
FIG. 4 illustrates a series of screens for a deployment planner depicting a user making changes in accordance with exemplary embodiments.

Now, turning to FIG. 4, after reviewing, e.g., the C directory of the virtual file system 125 in which planned changes have been made, a user of the communication device 130 and/or 135 may decide that the test file 315 should be moved to a different folder in the virtual file system 125. As discussed herein, the communication devices 130 and 135 may contain the same elements as communication device 105, such as memory 115, deployment planner 120, virtual file system 125, display 118, and user interface 119 (such as a mouse). The user of the communication device 130 may be in charge of reviewing changes to the virtual file system 125 made by the user of communication device 105, and the deployment planner 120 is configured to override changes to the virtual file system 125 made by the user of communication device 105. The user of the communication device 130 may be a senior administrator with reviewer privileges. For example, the user of communication device 130 may open the target folder 305 and an XYZ folder 410 to view their respective files in the virtual file system 125 as shown in screen 450 of the deployment planner 120. The XYZ folder 410 may include an M file 415 and the target folder 305 may include the test file 315. The user of communication device 130 may decide to move the test file 315 from the target folder 305 to the XYZ folder 410 as shown in screen 452 of the deployment planner 120. For instance, utilizing the deployment planner 120, the user may right click on the test file 315 with the mouse 119 and select move or cut. Via the deployment planner 120, the user can select the XYZ folder 410, and by right clicking on the mouse user interface 119 and selecting paste, the use can paste the test file 315 in the XYZ folder 410 of the virtual file system 125. In screen 454 of the deployment planner 120, the virtual file system 125 shows the empty target folder 305 without the test file 315 and shows the test file 315 in the XYZ folder 410 along with the M file 415.

In FIG. 4, a user of the communication device 135, e.g., with reviewing privileges for the deployment planner 120 may decide that the target folder 305 should be removed from the virtual file system 125. To delete the target folder 305 from the virtual file system 125 as shown in the screen 456 of the deployment planner 120, the user of the communication device 135 may click on the target folder 305 with the mouse user interface 119 and may press delete on the keyboard user interface 119. As a result, the user of the communication device 135 has deleted the target folder 305 from the virtual file system 125 and the deployment planner 120 provides a visual representation in screen 456 of the virtual file system 125 without the target folder 305.

Figure 2A:
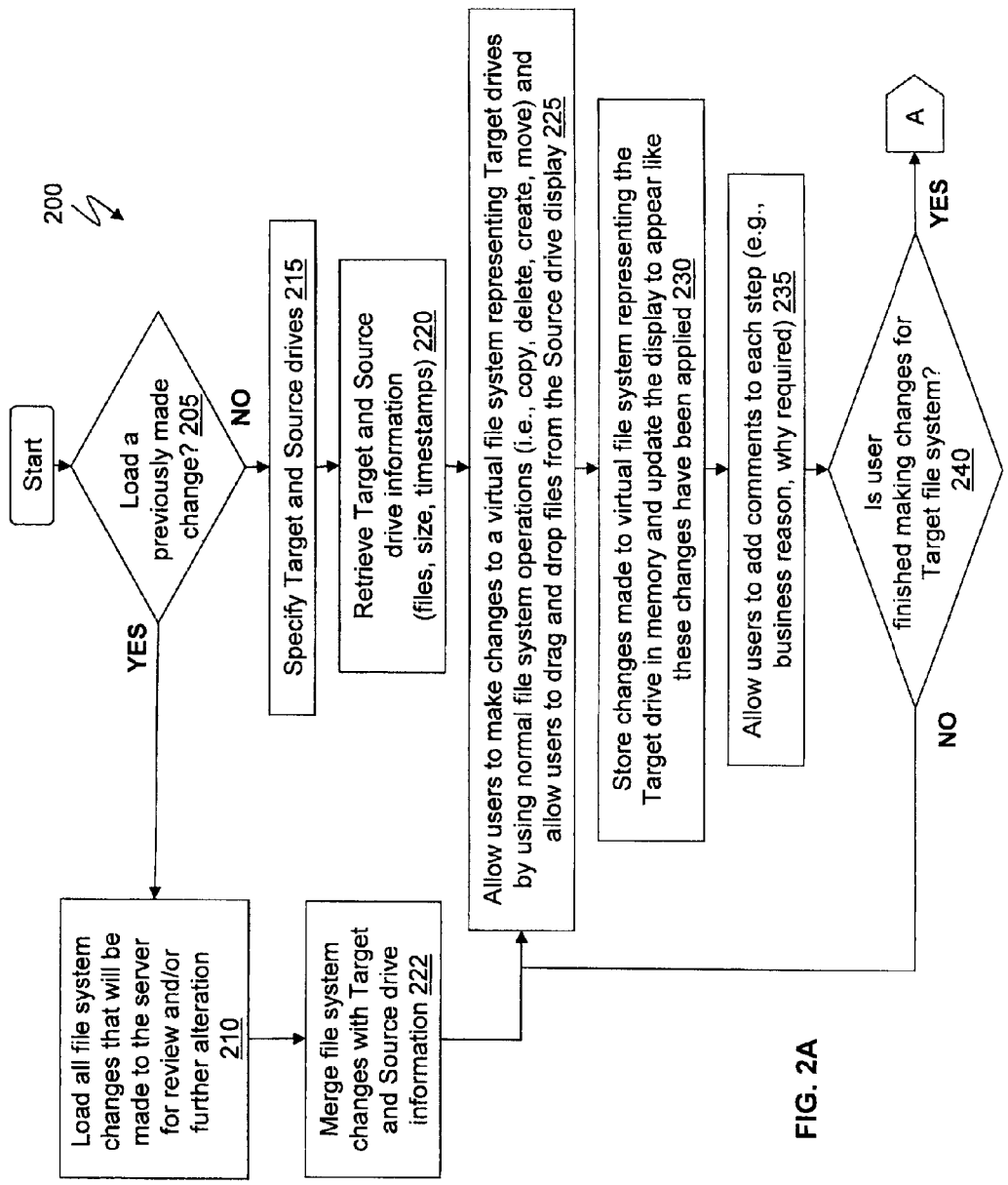
FIGS. 2A and 2B illustrate a flow chart in accordance with exemplary embodiments.
Figure 2B:
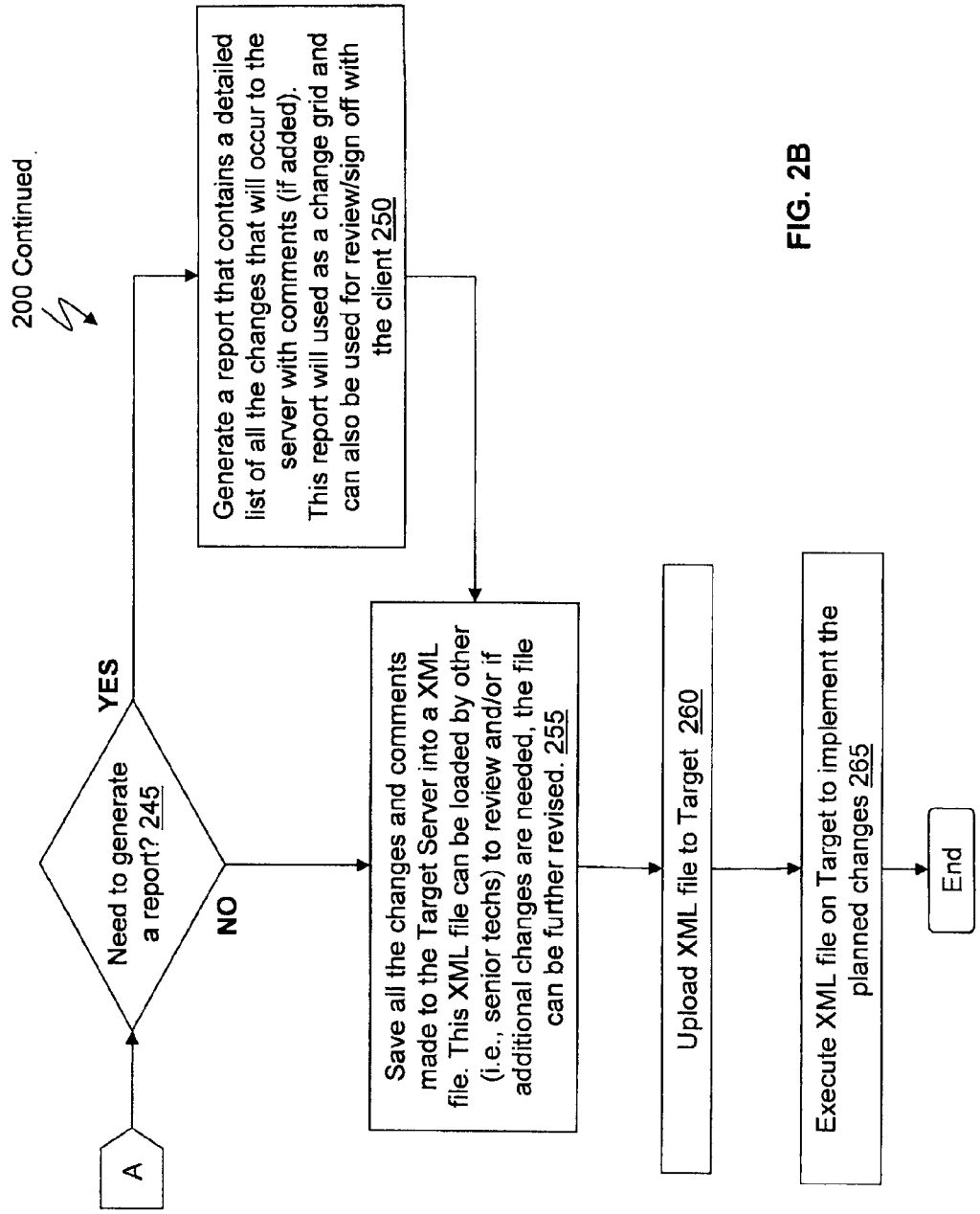

Now turning to FIGS. 2A and 2B, FIGS. 2A and 2B illustrate a flow chart 200 in accordance with exemplary embodiments.

The deployment planner 120 may determine whether the user of communication devices 105, 130, and/or 135 desire to load the virtual file system 125 which has been previously created, which can be an XML file comprising previous changes and modifications of the virtual file system 125 at 205. The XML file also may comprise the corresponding commands for each change made to the virtual file system 125. The user may have been previously working on the virtual file system 125, and/or a reviewer may want to review and modify changes made to the virtual file system 125 by a junior administrator, so the deployment planner 120 may load all file system changes planned for the target server 10 for review and further alteration at 210. The deployment planner 120 is configured to merge the file system changes of the virtual file system 125 with retrieved (updated) target and source drive information at 222. The deployment planner 120 is configured to display the virtual file system 125 so that the reviewer or user can view the virtual file system 125 on the display 118.

If the user does not want to load a previously made change, e.g., because the virtual file system 125 has not been created, the user can specify the target and source drives to the deployment planner 120 at 215. The target may be the target server 10, and more particularly the C drive of the target server 10. The source for copying files may be the source servers 50 and 60, and more particularly, the C drives of the source servers 50 and 60.

The deployment planner 120 is configured to retrieve the target and source drive information (files, size, timestamps, etc.) at 220. For example, the deployment planner 120 can communicate with the target server 10 to obtain (copy) information from the file system 15 via the network 30. The deployment planner 120 may copy the hierarchical management file structure for the A, B, C, D, E, and/or F drives of the file system 15 on the target server 10. Also, the deployment planner 120 may copy the hierarchical management file structure of the A, B, C, D, E, and/or F drives of the file system 55 on the source server 50, and the deployment planner 120 may presently and/or in the future copy any actual file contents for files on the source server 50 for duplication on the target server 10 as directed. The deployment planner 120 creates an interactive copy of the target file system 15 as the virtual file system 125, so that the user can make and/or view planned changes to the virtual file system 125 without affecting the target file system 15. Also, the deployment planner 120 checks to determine if any modifications have been made to the file system 15 of the target server 10 and file system 55 of the source server 50 since the virtual file system 125 was created or last updated. If modifications have been made, the deployment planner 120 merges the modifications with any planned changes made by the user to the virtual file system 125.

The deployment planner 120 allows users of the communication devices 105, 130, and/or 135 to make changes to the virtual file system 125 representing the target drive (such as the C drive) of the file system 15 by using normal file system operations (i.e., copy, delete, create, and move), and deployment planner 120 allows users to drag and drop files from the source drive view into the target drive view at 225.

The deployment planner 120 stores changes made to target drive in memory 115 (or any type of computer readable medium), e.g., as an XML file, and updates the display of the virtual file system 125 to appear like these changes have been applied at 230. For example, as the user is making changes to the virtual file system 125 the changes are pictorially represented on the display 118 and the changes are stored in the XML file. The XML file may also contain the data needed to generate the virtual file system 125 showing the hierarchical file system of the file system 15 with the previous changes.

The deployment planner 120 allows users to add comments (e.g., business reason or why required) to each command step that corresponds to the changes at 235. Each time a change is made to the virtual file system 125 that represents the files system 15 of the target server 10, the deployment planner 120 generates and saves the necessary commands to implement the change, which is shown in the command panel 525 in FIG. 7.

The deployment planner 120 determines whether the user is finished making changes at 240. If the user is not finished, the flow branches to box 225. If the user is finished making changes to the virtual file system 125 (pictorially representing the target file system 15), the deployment planner 120 asks the user should a report of the planned changes to the file system 15 be generated at 245. If yes, the deployment planner 120 generates a report that contains a detailed list of all the planned changes that will occur to the file system 15 target server 10 with comments at 250. This report is designed to be a change grid and can also be used for review/sign off by the client (e.g., the owner of the target server 10).

If the report is not needed and/or if the report is generated, the deployment planner 120 saves all planned changes (including correspond commands) and comments made to the virtual file system 125 representing the file system 15 of the target server 10 into a file, such as a XML at 255. The XML file can be loaded by others (i.e., senior administrators) to review and/or if additional changes are needed, the XML file can be further revised utilizing the process discussed herein.

The deployment planner 120 can upload the XML file to the target server 10 at 260. The deployment planner 120 can execute the XML file on the target server 10 to implement the planned changes on the file system 15 at 265. The deployment planner 120 (or a portion) may also be installed in memory 12 and/or run on the target server 10, and the deployment planner 120 can execute the XML file to implement the commands of the planned changes represented in the virtual file system 125.

Additionally and/or alternatively, for example, the deployment planner 120 may provide the XML file (e.g., via a scheduled task or operator starting a job) to a deployment bot and instruct the deployment bot on the target server 10 to execute the XML file. The deployment bot reads in the XML file to follow the commands and make the planned changes to the file system 15.

Further examples of utilizing the deployment planner 120 are shown in FIGS. 5-14 in accordance with exemplary embodiments.

Figure 5:
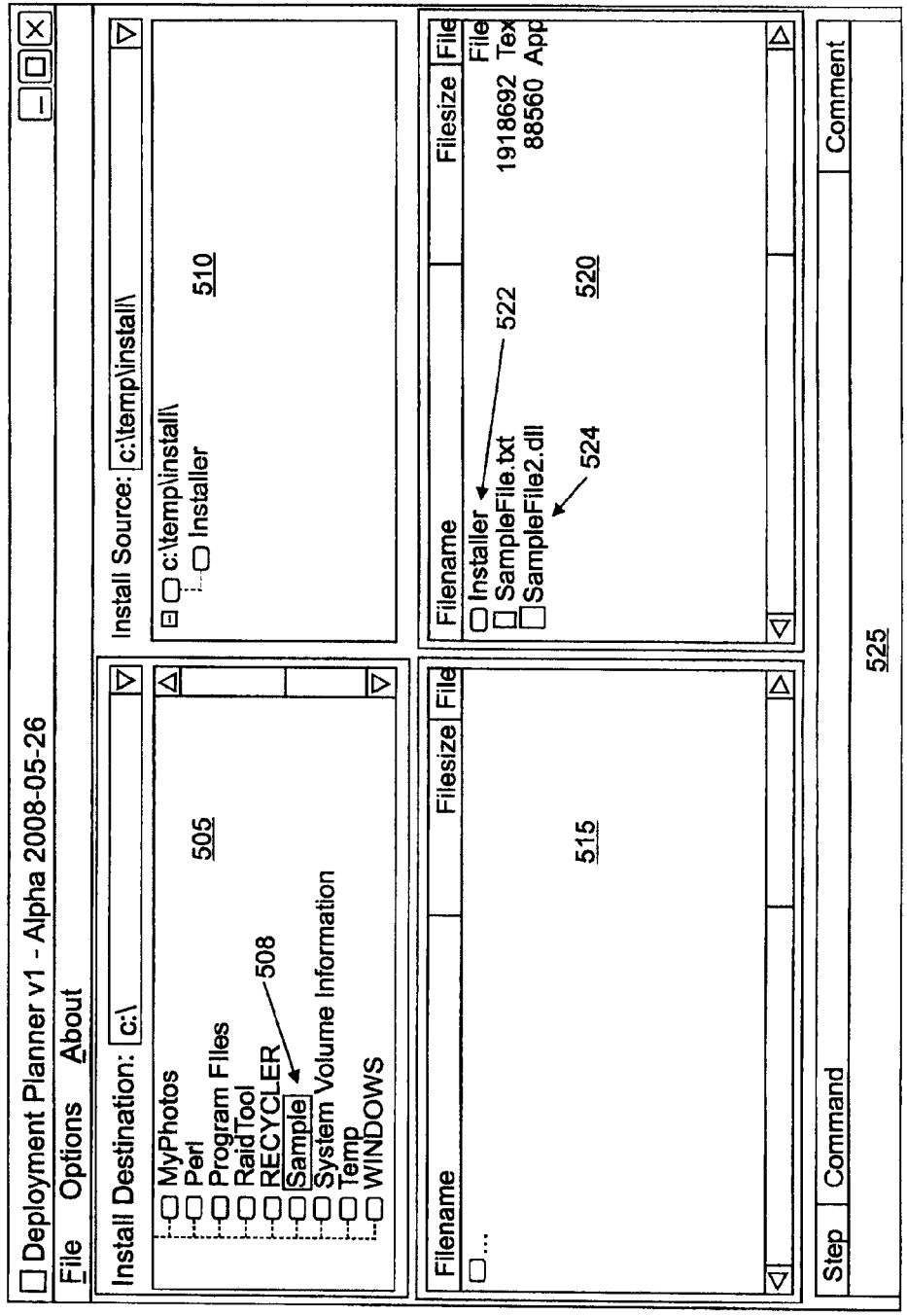

FIG. 5 illustrates a view on the deployment planner 120 in accordance with exemplary embodiments. Panel 505 of the deployment planner 120 shows the virtual file system 125 illustrating the files in the install destination of the target server 10. The install destination may be the C drive of the file system 15. The hierarchical structure of the file system 15 has been copied and pictorially represented as the virtual file system 125 in panel 505. Sample folder 508 of the virtual file system 125 has been highlighted by the user, and panel 515 shows that the sample folder 508 is empty.

Panel 510 shows the files of the install source, which may be the source file system 55 of the source server 50. Panel 520 shows the files in the installer folder 522 of the source file system 55, and the installer folder includes SampleFile2.dll 524. The deployment planner 120 also shows the command panel 525, which illustrates the command instructions for each planned change made to the virtual file system 125. In this example, the command panel 525 is empty in FIG. 5 because the user has not made any planned changes to the virtual file system 125.

Figure 6:
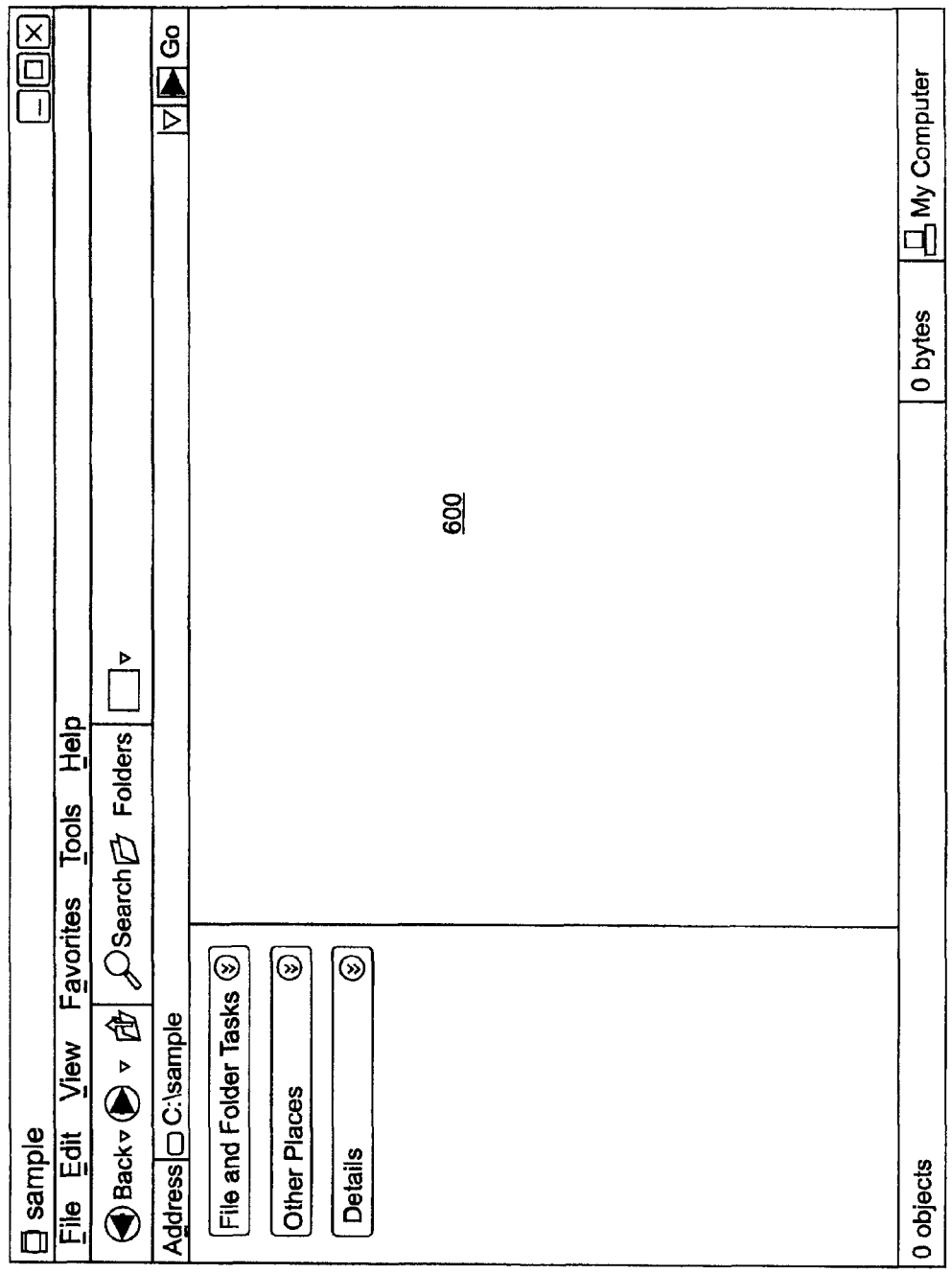

FIG. 6 illustrates the contents of the actual sample file of the file system 15 on the target server 10. Panel 600 shows that the sample file of the target file system 15 is empty.

FIG. 7 illustrates that the user has made changes to the virtual file system 125 which are shown in the panel 505. The user has created folder 705 as a subfolder of the sample folder 508. Panel 515 shows that the user has added SampleFile2.dll 524 (shown in FIG. 5) from the file system 55 of the source server 50 to the newly created folder 705.

In the example shown in FIG. 7, the panel 510 now illustrates the file system 65 of the source server 60. As discussed herein, there can be numerous sources from which files are copied to the virtual file system 125. The deployment planner 120 shows that the source server 60 also has an installer folder and the installer folder includes setup.msi file 710 in the panel 520. The command panel 525 shows each step of the changes made by the user. In step 4 of the command panel 525, the user copied the file setup.msi 710 to the sample folder 508 of the virtual file system 125. However, the setup.msi 710 is not shown under the sample folder 508 in panel 505. This is because the setup.msi file 710 was deleted from the sample folder 508 at step 5 of the command panel 525. Even though the panel 505 does not show the setup.msi file 710, the user's actions of copying and deleting the setup.msi file 710 are recorded in the command panel 525. By showing each command taken by the user (even seemingly contradictory actions) in the command panel 525, a reviewer, e.g., utilizing communication device 130 can visually see the thought processes of the user (e.g., a junior administrator) and may come back later to remove the delete command at step 5 of the command panel 525.

FIG. 8 again shows the sample folder of the actual target file system 15 in panel 600. Even though in the virtual file system 125 representing the target file system 15 in FIG. 7 the deployment planner 120 makes it appear that the user's changes have occurred, the panel 600 still shows that the sample folder in the actual file system 15 of the target server 10 is empty.

Figure 8:
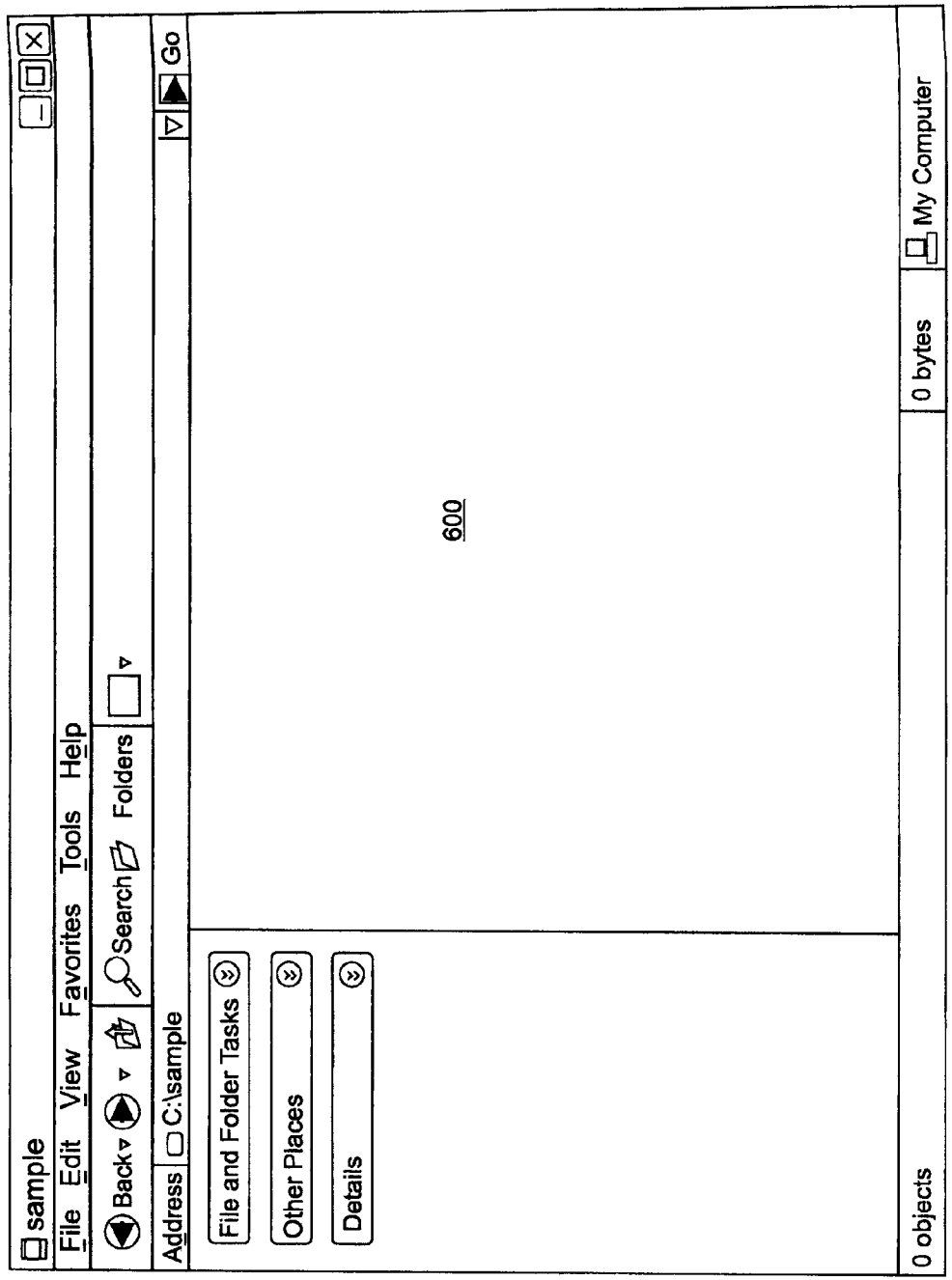
Figure 9:
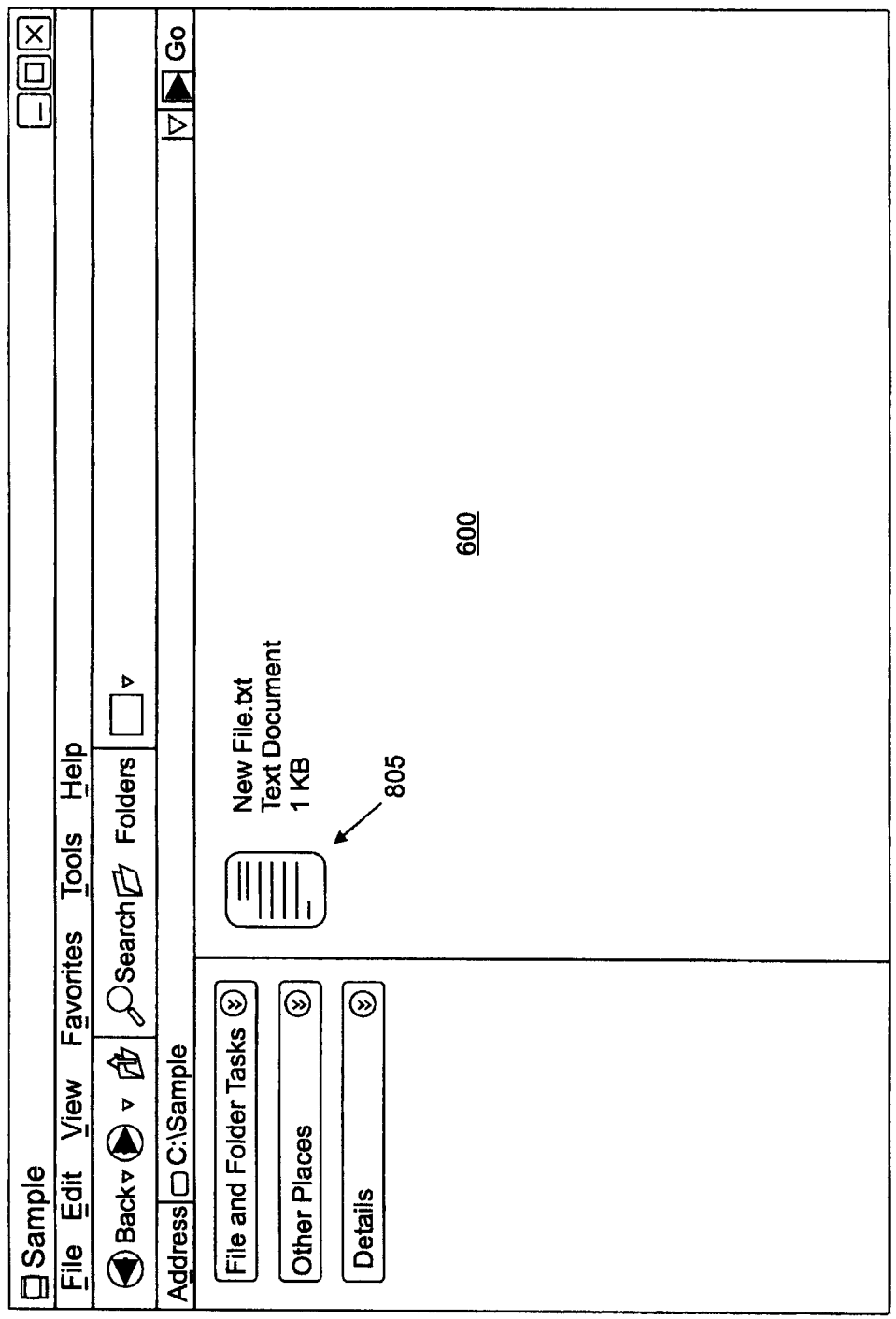

FIG. 9 illustrates that a modification has occurred to the actual file system 15. In FIG. 8, the sample folder of the file system 15 was empty in panel 600. Even though changes are being planned for the file system 15, someone or an automatic process has added a NewFile.text 805 to the sample folder. The deployment planner 120 is configured to periodically check with the target server 10 to automatically determine if any modifications have been made to the file system 15 since the virtual file system 125 has been created. Also, the user may request that the deployment planner 120 check with the target server 10 to determine if changes have been made to the file system 15. Each time the deployment planner 120 is initiated to use the virtual file system 125, the deployment planner 120 may automatically check with the target server 10 to determine if modifications are made to the file system 15. The deployment planner 120 ensures that the virtual file system 125 accurately reflects any changes made to the file system 15 after its creation.

Figure 10:
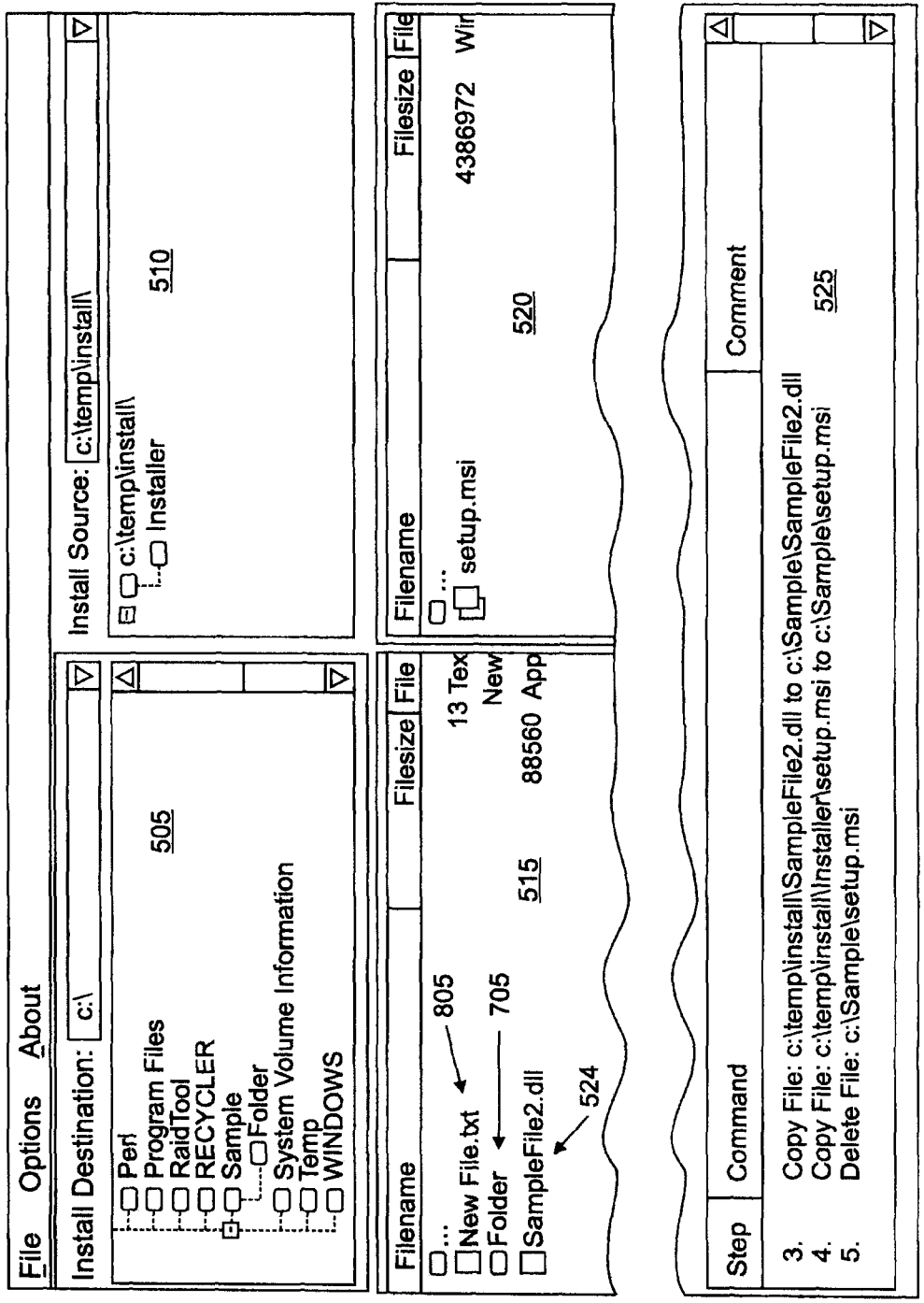

Since the deployment planner 125 recognizes that the NewFile.text 805 has been introduced to the file system 15, the deployment planner 125 merges the changes that the user has made with the modifications made to the updated file system 15 by showing the NewFile.txt 805 in panel 515 of FIG. 10. No commands are generated in the command panel 525 because the update to the virtual file system 125 shown in panel 515 is a result of a modification made directly to the file system 15 and not as a result of changes made by the user of the communication device 105.

Figure 11:
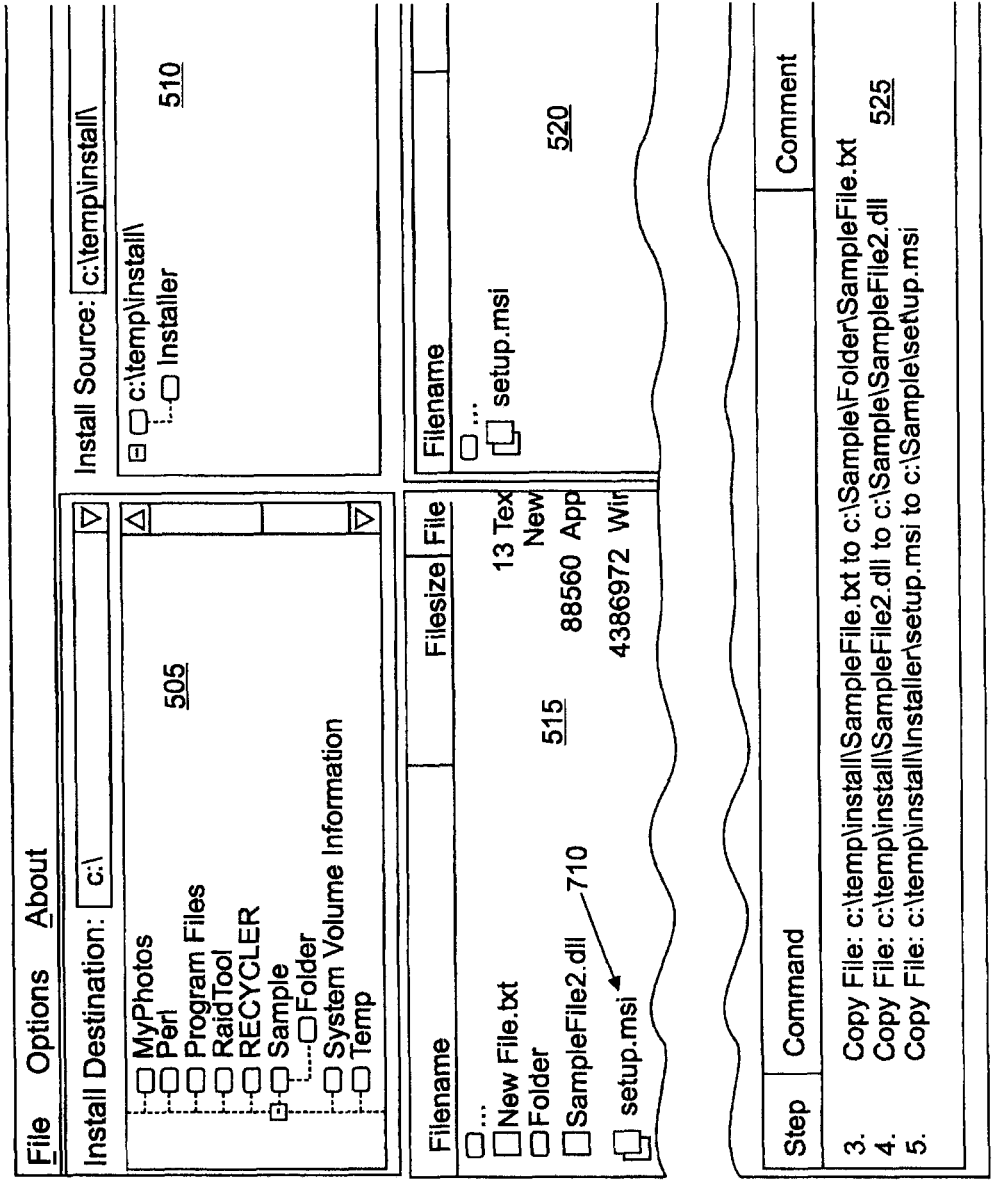

In FIG. 11, the delete file command (Delete File: c:\Sample\setup.msi) has been removed, e.g., by the reviewer utilizing the communication device 130. Since the reviewer is a senior administrator, the command step 5 is removed from the command panel 525 of the deployment planner 120. Correspondingly, the panel 515 again shows the setup.msi file 710.

Figure 12:
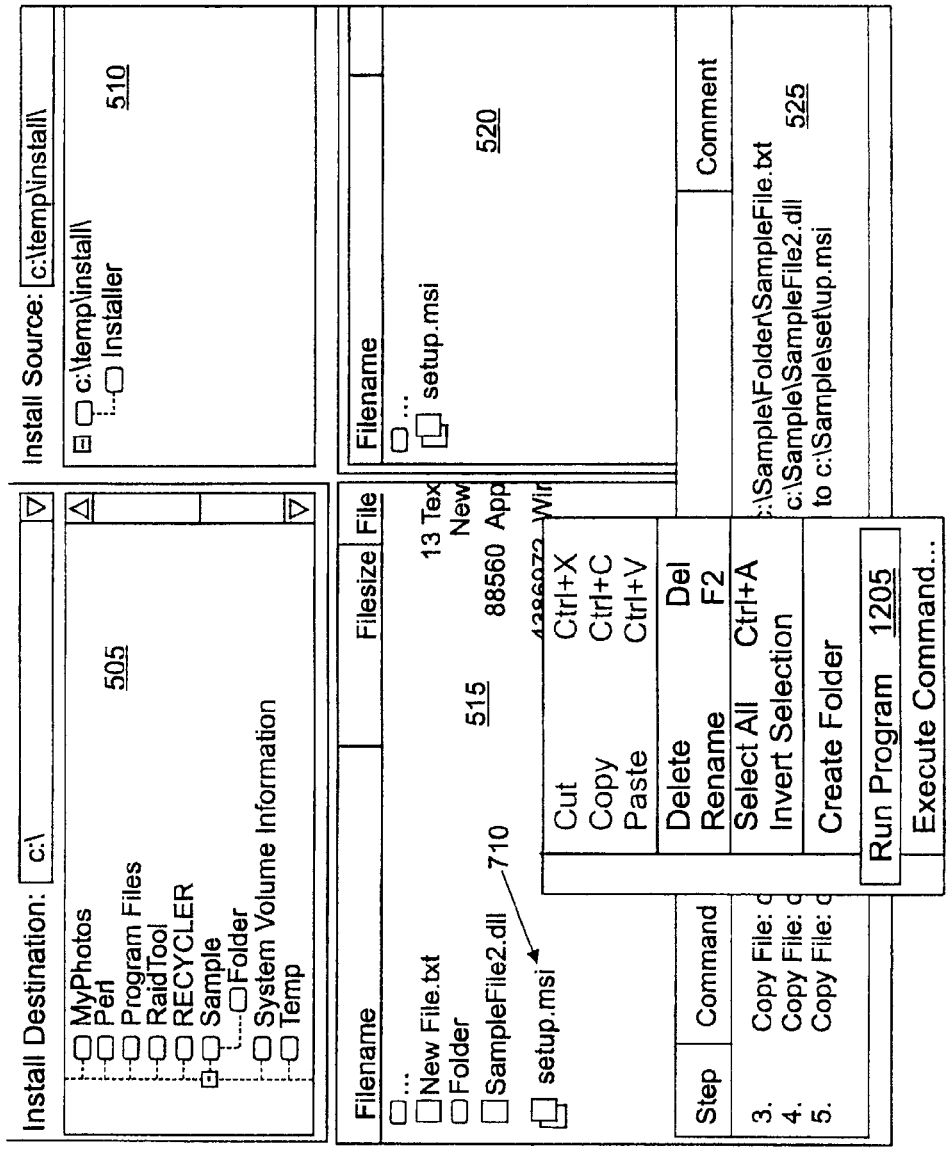

FIG. 12 illustrates that all the options normally available for managing file systems are available in the deployment planner 120. For example, the user may highlight the setup.msi file 710, right click the mouse user interface 119, and select run program 1205. By selecting run program 1205 on the virtual file system 125, selecting run program 1205 will cause the setup.msi file 710 to execute when the planned changes are executed on the target server 10.

Figure 13:
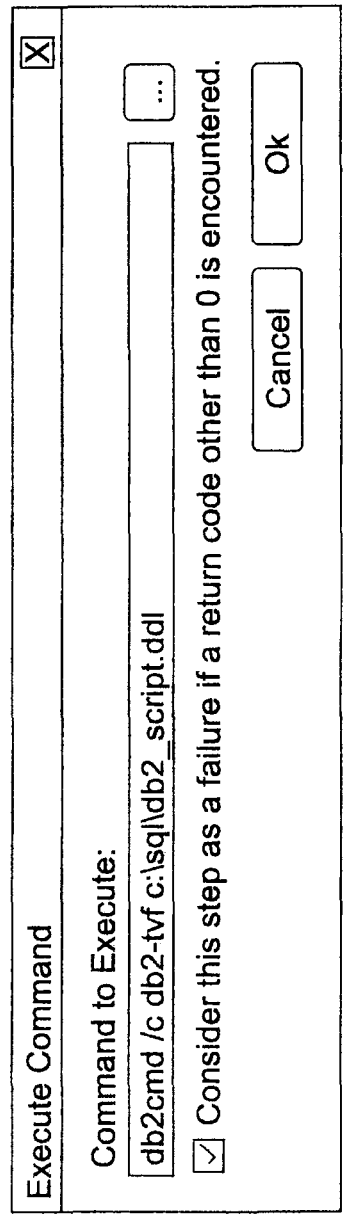

FIG. 13 illustrates that the deployment planner 120 provides the user with the ability to execute manual commands in the GUI environment of the virtual file server 125. Box 1300 shows an example of manual commands input by the user on the deployment planner 120. The deployment planner 120 will cause the manual commands in the box 1300 to be executed when the planned changes are executed on the target server 10.

FIG. 14 shows box 1400 which illustrates a sample report generated by the deployment planner 120. The sample report in box 1400 shows a list of steps that need to be executed on the target server 10 for the planned changes to take effect.

It is understood by one skilled in the art that each element such as the devices, modules, systems, interfaces, adapters, networks, controllers, computers, servers, etc., described in the present disclosure contains all the necessary hardware, software, and/or firmware to operate and function as discussed herein in accordance with exemplary embodiments and to operate and function as understood by one skilled in the art.

Figure 15:
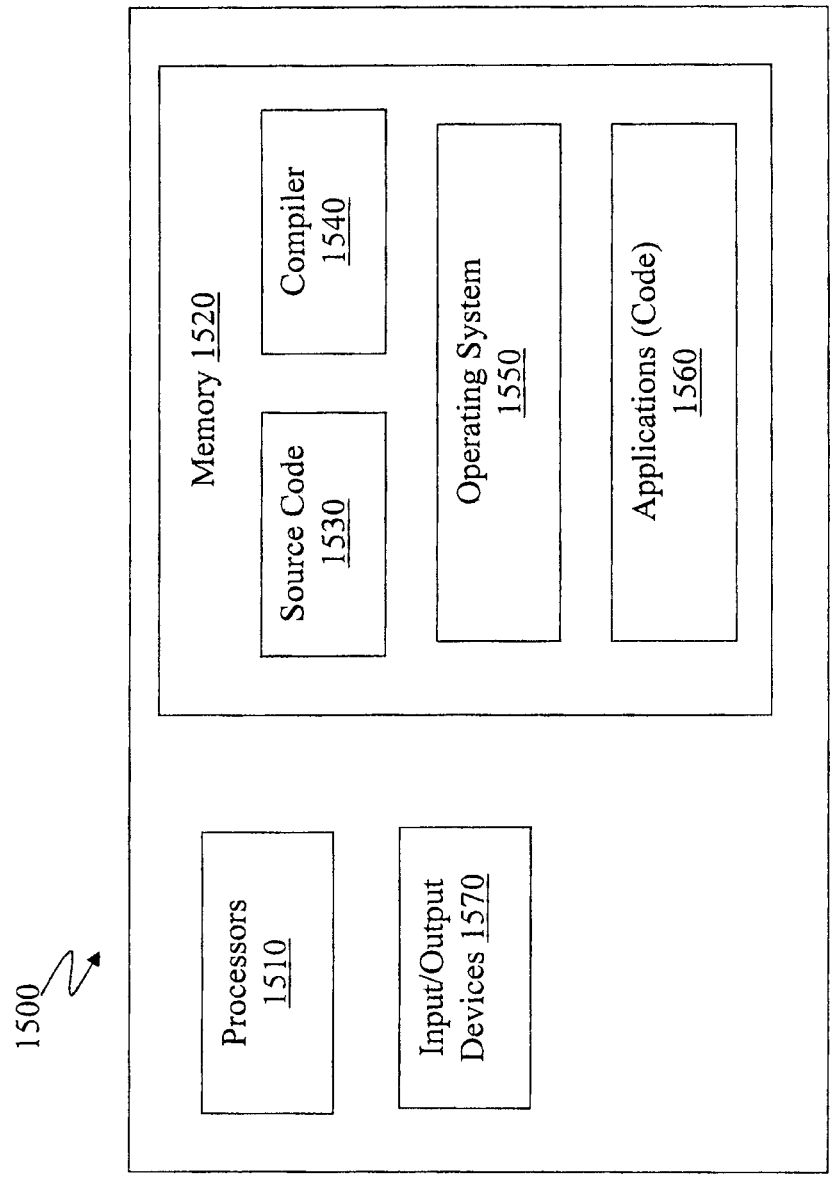
FIG. 15 illustrates an example of a computer having capabilities, which may be included in exemplary embodiments.

FIG. 15 illustrates an example of a computer 1500 having capabilities, which may be included in exemplary embodiments. Various methods, procedures, processes, modules, and techniques discussed herein may also incorporate and/or utilize the capabilities of the computer 1500. One or more of the capabilities of the computer 1500 may be implemented in any element discussed herein, such as the communication devices 105, 130, and 135, and the servers 10, 50, and 60. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Generally, in terms of hardware architecture, the computer 1500 may include one or more processors 1510, computer readable memory 1520, and one or more input and/or output (I/O) devices 1570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 1510 is a hardware device for executing software that can be stored in the memory 1520. The processor 1510 can be virtually any custom made or commercially available processor, a central processing unit (CPU), a data signal processor (DSP), or an auxiliary processor among several processors associated with the computer 1500, and the processor 1510 may be a semiconductor based microprocessor (in the form of a microchip) or a macroprocessor.

The computer readable memory 1520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1520 may incorporate electronic, magnetic, optical, and/or other types of storage media. Note that the memory 1520 can have a distributed architecture, where various components are situated remote from one another, but can be accessed by the processor 1510.

The software in the computer readable memory 1520 may include one or more separate programs, each of which comprises an ordered listing of executable instructions for implementing logical functions. The software in the memory 1520 includes a suitable operating system (O/S) 1550, compiler 1540, source code 1530, and one or more applications 1560 of the exemplary embodiments. As illustrated, the application 1560 comprises numerous functional components for implementing the features, processes, methods, functions, and operations of the exemplary embodiments. The application 1560 of the computer 1500 may represent numerous applications, agents, software components, modules, interfaces, etc., as discussed herein but the application 1560 is not meant to be a limitation. For example, the application 1560 may represent the deployment planner 120, the virtual file system 125, and/or any other software that can be utilized to implement exemplary embodiments.

The operating system 1550 may control the execution of other computer programs, and provides scheduling, input-output control, file and data management, memory management, and communication control and related services.

The application(s) 1560 may employ a service-oriented architecture, which may be a collection of services that communicate with each other. Also, the service-oriented architecture allows two or more services to coordinate and/or perform activities (e.g., on behalf of one another). Each interaction between services can be self-contained and loosely coupled, so that each interaction is independent of any other interaction.

Further, the application 1560 may be a source program, executable program (object code), script, or any other entity comprising a set of instructions to be performed. When a source program, then the program is usually translated via a compiler (such as the compiler 1540), assembler, interpreter, or the like, which may or may not be included within the memory 1520, so as to operate properly in connection with the O/S 1550. Furthermore, the application 1560 can be written as (a) an object oriented programming language, which has classes of data and methods, or (b) a procedure programming language, which has routines, subroutines, and/or functions.

The I/O devices 1570 may include input devices (or peripherals) such as, for example but not limited to, a mouse, keyboard, scanner, microphone, camera, etc. Furthermore, the I/O devices 1570 may also include output devices (or peripherals), for example but not limited to, a printer, display, etc. Finally, the I/O devices 1570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 1570 also include components for communicating over various networks, such as the Internet or an intranet. The I/O devices 1570 may be connected to and/or communicate with the processor 1510 utilizing Bluetooth connections and cables (via, e.g., Universal Serial Bus (USB) ports, serial ports, parallel ports, firewire, HDMI (High-Definition Multimedia Interface), etc.).

When the computer 1500 is in operation, the processor 1510 is configured to execute software stored within the memory 1520, to communicate data to and from the memory 1520, and to generally control operations of the computer 1500 pursuant to the software. The application 1560 and the O/S 1550 are read, in whole or in part, by the processor 1510, perhaps buffered within the processor 1510, and then executed.

When the application 1560 is implemented in software it should be noted that the application 1560 can be stored on virtually any computer readable medium for use by or in connection with any computer related system or method.

The application 1560 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

In exemplary embodiments, where the application 1560 is implemented in hardware, the application 1560 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 1500 includes non-limiting examples of software and hardware components that may be included in various devices and systems discussed herein, and it is understood that additional software and hardware components may be included in the various devices and systems discussed in exemplary embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for implementing changes to a file system of a computing device, the file system comprising a plurality of individual files, the method comprising:
    creating a virtual file system as a copy of a hierarchical structure of a file system of a computing device, the virtual file system appearing as the actual file system of the computing device when displayed and being a graphical representation of the file system of the computing device;
    allowing a user to make changes to the individual files of the virtual file system without affecting the file system of the computing device;
    modifying an appearance of the virtual file system responsive to the user making changes to the individual files of the virtual file system to reflect the changes made by the user, wherein the changes to the individual files of the virtual file system are stored;
    updating the virtual file system responsive to a modification to the file system of the computing device so that the virtual file system is current with respect to the file system of the computing device and in addition updating the virtual file system with the changes to the individual files made by the user, wherein the appearance of the virtual file system shows an integration of both the modification to the file system of the computing device and the changes made by the user;
    generating commands in the virtual file system responsive to the user making changes to the individual files of the virtual file system, wherein the commands reflect the changes to the individual files of the virtual file system, and wherein the commands are stored; and
    providing the commands for execution on the computing device, the commands causing the file system of the computing device to reflect the changes made to the individual files of the virtual file system.

2. The method of claim 1, further comprising displaying the virtual file system and commands on a display of a communication device.

3. The method of claim 1, further comprising receiving a selection identifying the computing device having the file system.

4. The method of claim 1, wherein the commands are to reflect only each of the changes made by the user to the virtual file system.

5. The method of claim 1, wherein the commands are computer executable instructions that can be executed on the computing device.

6. The method of claim 1, wherein the appearance of the virtual file system pictorially illustrates the hierarchical structure of files in the file system of the computing device.

7. The method of claim 1, wherein the virtual file system appearing as the file system of the computing device when displayed allows the user to interact with the virtual file system as though the user is interacting with the file system of the computing device; and
    wherein the user can make changes to the virtual file system by utilizing operations comprising at least one of create, open, edit, view, print, execute, play, rename, move, copy, and delete.

8. The method of claim 1, further comprising copying files from a first device.

9. The method of claim 1, comprising displaying files of the virtual file system, a listing of the commands that reflect only changes to the virtual file system, and a first file system of a first device;
- wherein the user can make changes to the virtual file system by copying files from the displayed first file system of the first device to the virtual file system; and
- wherein the listing of the commands and the virtual file system both reflect the copying of files from the first file system of the first device.

10. The method of claim 1, wherein the modification of the file system of the computing device is distinct and different from the changes made by the user.

11. A communication device configured to implement changes to a file system of a computing device, the file system of the computing device comprising a plurality of individual files, the communication device comprising:
- memory for storing a deployment planner; and
- a processor, functionally coupled to the memory, the processor being responsive to computer-executable instructions contained in the deployment planner and operative for:
- creating a virtual file system as a copy of a hierarchical structure of a file system of a computing device, the virtual file system appearing as the actual file system of the computing device when displayed and being a graphical representation of the file system of the computing device;
- allowing a user to make changes to the individual files of the virtual file system without affecting the file system of the computing device;
- in response to the user making changes to the individual files of the virtual file system, correspondingly modifying an appearance of the virtual file system to reflect the changes made by the user, wherein the changes to the individual files of the virtual file system are stored;
- updating the virtual file system responsive to a modification to the file system of the computing device so that the virtual file system is current with respect to the file system of the computing device and in addition updating the virtual file system with the changes to the individual files made by the user, wherein the appearance of the virtual file system shows an integration of both the modification to the file system of the computing device and the changes made by the use;
- in response to the user making changes to the virtual file system, generating commands corresponding to the changes the individual files of the virtual file system made by the user, wherein the commands reflect changes to the individual files of the virtual file system, and wherein the commands are stored; and
- providing the commands in a file for execution on the computing device, the commands causing the file system of the computing device to reflect the changes made to the individual files of the virtual file system.

12. The communication device of claim 11, further comprising displaying the virtual file system and commands on a display of the communication device.

13. The communication device of claim 11, further comprising receiving a selection identifying the computing device having the file system.

14. The communication device of claim 11, wherein the commands are to reflect only each of the changes made by the user to the virtual file system.

15. The communication device of claim 11, wherein the commands are computer executable instructions that can be executed on the computing device.

16. The communication device of claim 11, wherein the appearance of the virtual file system pictorially illustrates the hierarchical structure of files in the file system.

17. The communication device of claim 11, wherein the virtual file system appearing as the file system of the computing device when displayed allows the user to interact with the virtual file system as though the user is interacting with the file system of the computing device; and
- wherein the user can make changes to the virtual file system by utilizing operations comprising at least one of create, open, edit, view, print, execute, play, rename, move, copy, and delete.

18. A computer program product for implementing changes to a file system of a computing device, the file system of the computing device comprising a plurality of individual files, the computer program product comprising:
- a nontransitory computer readable storage medium having computer readable program code embodied therewith, the computer readable program code comprising:
- computer readable program code configured to create a virtual file system as a copy of a hierarchical structure of a file system of a computing device, the virtual file system appearing as the actual file system of the computing device when displayed and being a graphical representation of the file system of the computing device;
- computer readable program code configured to allow a user to make changes to the individual files of the virtual file system without affecting the file system of the computing device;
- computer readable program code configured to modify an appearance of the virtual file system responsive to the user making changes to the individual files of the virtual file system to reflect the changes made by the user, wherein the changes to the individual files of the virtual file system are stored;
- computer readable program code configured to update the virtual file system responsive to a modification to the file system of the computing device so that the virtual file system is current with respect to the file system of the computing device and in addition to update the virtual file system with the changes to the individual files made by the user, wherein the appearance of the virtual file system shows an integration of both the modification to the file system of the computing device and the changes made by the user;
- computer readable program code configured to generate commands in the virtual file system responsive to the user making changes to the individual files of the virtual file system, wherein the commands reflect changes to the individual files of the virtual file system, and wherein the commands are stored; and
- computer readable program code configured to provide the commands in a file for execution on the computing device, the commands causing the file system of the computing device to reflect the changes made to the individual files of the virtual file system.

* * * * *